April 5, 1960     R. J. KELLER     2,931,629
DEER PULL AND PULLEY
Filed April 4, 1958     2 Sheets-Sheet 1
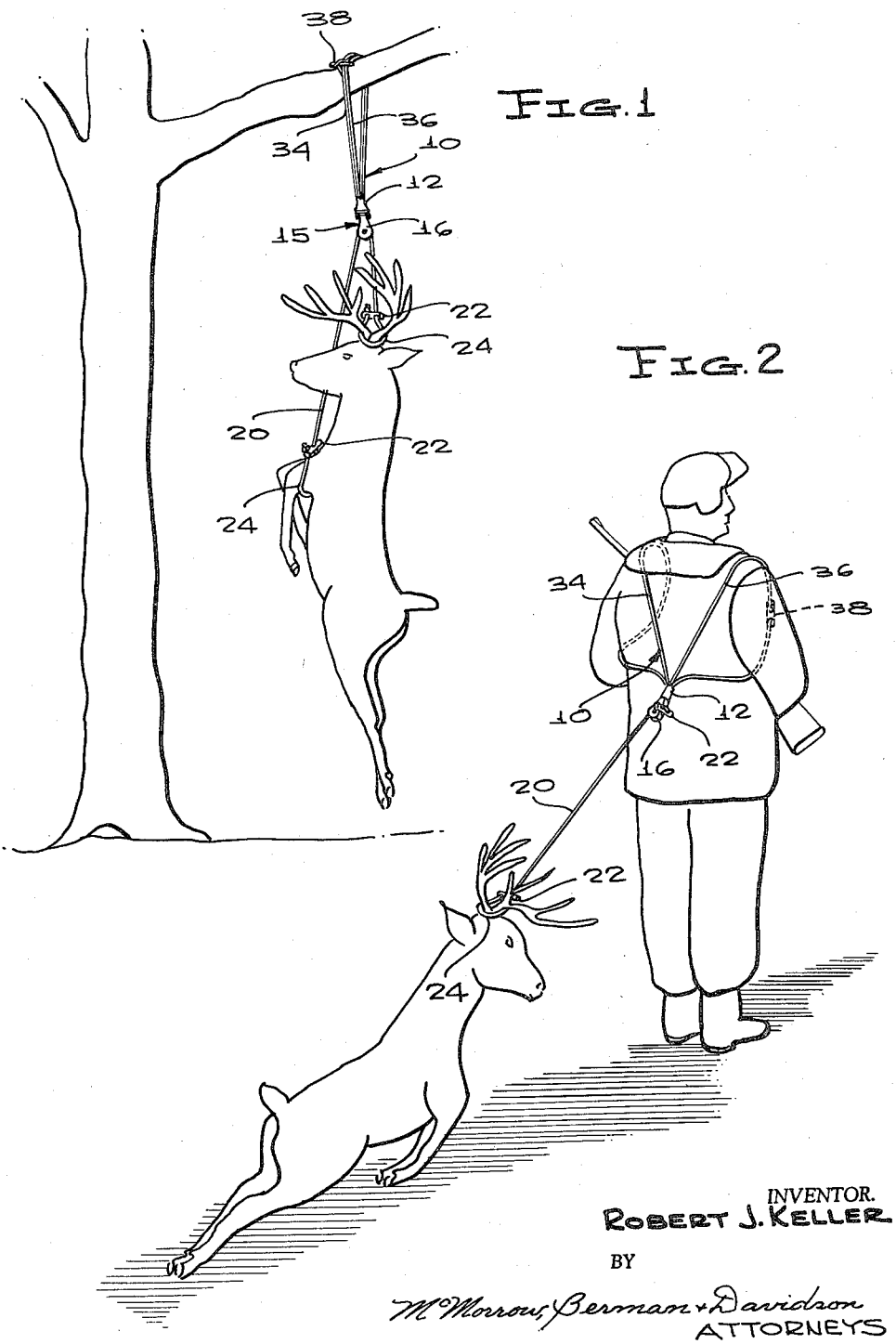
INVENTOR.
ROBERT J. KELLER
BY
McMorrow, Berman & Davidson
ATTORNEYS April 5, 1960 R. J. KELLER 2,931,629
DEER PULL AND PULLEY
Filed April 4, 1958 2 Sheets-Sheet 2
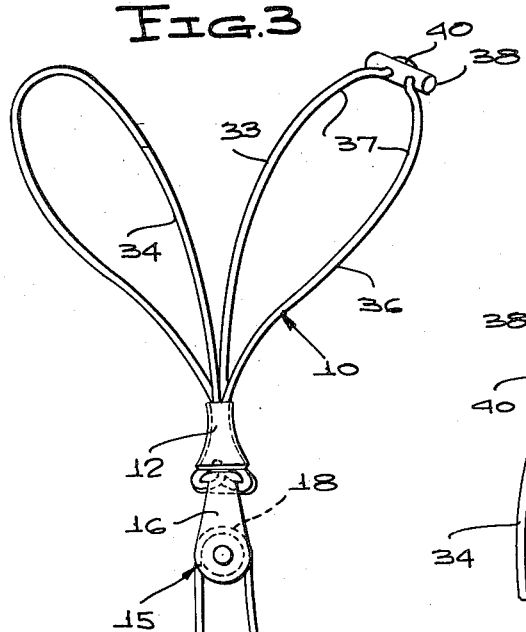
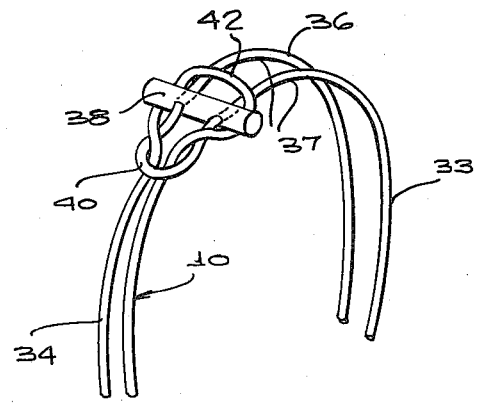
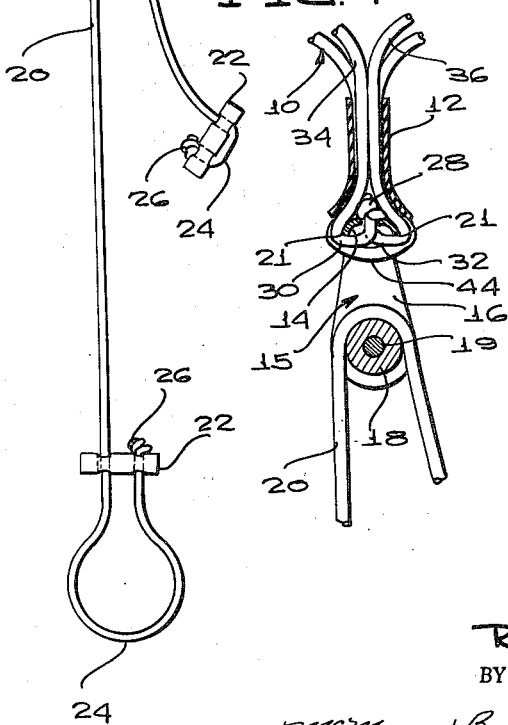
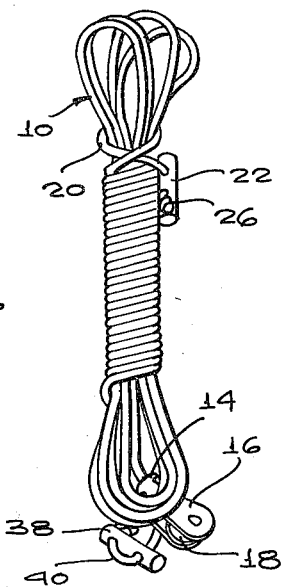
INVENTOR.
ROBERT J. KELLER
BY
McMorrow, Berman & Davidson
ATTORNEYS

2,931,629
DEER PULL AND PULLEY

Robert J. Keller, Hazel Park, Mich.

Application April 4, 1958, Serial No. 726,559

6 Claims. (Cl. 254—195)

This invention relates to a deer pull and pulley, usable to advantage in various ways, as for example, for the purpose of suspending a deer from a tree limb, or alternatively, as means for dragging the animal to camp from the location at which it was shot and killed.

The main object of the present invention is to provide a generally improved deer pull and pulley, which will be so designed as to have a high degree of versatility, despite the very low cost thereof.

Another object is to provide a deer pull which will be adapted to be folded compactly, so that it can be carried neatly in the pocket of one's hunting clothes.

Another object is to facilitate the conversion of the device from its use as a deer suspension means, to a deer drag, and vice versa.

Another object is to so form the device that it will be adapted to prevent chafing of the suspension rope upon a tree trunk or limb when the deer is suspended at camp.

Another object is to so form the device that it will be of exceptional strength and safety, in relation to its relatively low cost and its adaptability for storage in a small area.

Another object is to form the device in a manner such as to eliminate necessity of the use of pads therewith, when it is in use as a deer drag.

Another object is to so form the device that it can be attractively colored, as for example by the color red, so that it can be of marked visibility and can be readily located.

Other objects will appear from the following description, the claims appended thereto, and from the annexed drawings, in which like reference characters designate like parts throughout the several views, and wherein:

Figure 1 is a side elevational view of the device in use for suspending a deer from a tree limb;

Figure 2 is a perspective view showing the device in use as a deer drag;

Figure 3 is an enlarged elevational view of the device per se;

Figure 4 is a still further enlarged, detail sectional view of the pulley and sleeve means of the device;

Figure 5 is a fragmentary, enlarged perspective view, the scale of which is enlarged above that of Figure 3, showing the manner in which the device is converted for use in suspending a deer from a tree limb; and Figure 6 is an enlarged, elevational view of the device folded for being carried in the pocket or in one's pack.

Referring to the drawing in detail, designated generally at 10 is the device constituting the present invention. The device includes, as one important component thereof, a retaining sleeve 12, the construction of which is shown to particular advantage in Figure 4. Said sleeve 12, as will be noted from Figures 3 and 4, is of substantially constant diameter for a substantial part of the length thereof, being then progressively increased in diameter toward one end, so that the sleeve is of a flaring formation at the end thereof appearing as the lower end in Figures 3 and 4.

Designated at 14 is an end wall or bight portion of a pulley housing 15 that also includes side walls 16 disposed in parallel planes and connected fixedly at one end by the bight portion 14. Side walls 16 are progressively increased in width in a direction away from the bight portion 14, and at their wider ends receive a pulley 18 which is rotatable upon a pin 19 that extends between the side walls 16. Thus, the pulley rotates about an axis disposed perpendicularly to the lengths of the guide sleeve and pulley housing, that is, the axis of the pulley 18 can be said to be extended transversely across the length of the sleeve in spaced relation to the sleeve.

Wall 14, as will be noted from Figure 4, is bowed in a direction toward the sleeve 12, having ends 21 projecting away from the sleeve 12 so as to form relatively sharp abutments about which the flexible members of the invention can be engaged in a manner to be described in greater detail hereafter.

A first flexible element 20, which may appropriately be termed a lower flexible element, may in a preferred embodiment comprise a length of strong rope material, formed to a length of approximately eight feet. In any event, the lower flexible element 20 is trained about the pulley 18, and at opposite ends of the flexible element, there are provided loop-forming bars 22 which in a preferred embodiment would be formed from straight, short lengths of aluminum material. The bars 22 are identical, each having adjacent its opposite ends transverse openings through which the element 20 is looped at its ends, thus forming end loops 24 which can be opened to any desired size or can be closed completely. To hold the ends of the flexible element against slippage out of the bars 22, knots 26 are formed upon the extremities of said element.

An upper flexible element is formed separately from the element 20, and has been designated at 33. This is so formed as to define two large loops 34, 36 above the sleeve 12. One loop 36, at the end thereof remote from the sleeve 12, has its opposite side portions 37 extending through spaced openings formed in a bar 38, so as to form an auxiliary loop 40 on the outer end of the loop 36. Loop 40 can be opened to any of various sizes, or can be closed completely.

As will be noted from Figure 4, at their inner ends the loops 34, 36 are extended into the sleeve 12, that is, the opposite side portions of each of the elongated loops 34, 36 are extended through said sleeve. The extremities of the flexible element 33 are brought upwardly through opening 28 formed in the end wall 14 of the pulley housing (see Figure 4) and are knotted within the flared end portion of the tube 12.

In other words, medially between its ends the flexible element 33 is extended as at 44 through the pulley housing between the walls 16, about the end wall 14. Then, adjacent the portion 44, the material of the flexible element 33 is extended through the sleeve 12, and is extended above the sleeve to form the two loops 34, 36, being then extended back into the sleeve, with the extremities of the flexible element 33 being engaged about the lips 21 and extended through the openings 28 and knotted above the wall 14.

In use of the device, and assuming that it is to be used as a deer pulley as in Figure 1, for the purpose of suspending the animal from a tree limb, one opens a loop 24 on one end of the element 20, sufficiently to engage the same about the head of the deer. The loop can be extended about the antlers as shown in Figure 1, after which the loop is closed to whatever extent is desired. The respective loops 34, 36 are connected at their outer ends in the manner shown in Figure 5, over the tree limb. In other words, loop 40 is opened to some extent, after which the outer end of loop 34 is extended through the loop 40. The side portions of the loop 34 are then, above loop 40, hooked under the ends of the bar 38 in the manner shown in Figure 5, providing a loop 42 that is in overlying relation to the side portions 37 of the loop 36. When the weight of the deer is imposed upon the connected loops 34, 36, they are drawn tightly into engagement with each other above the tree limb, providing a secure connection of the device to the tree limb. At the same time, the arrangement is such that the device can be readily disengaged from the tree limb, merely by disengaging the bar 38 from the loop 42.

When the deer has been pulled up, the loop 24 at the other end of the flexible element 20 can be opened, and engaged about the forelegs of the animal in the manner shown in Figure 1.

The arrangement has many advantages, in that the chafing of the rope over the tree limb is eliminated, and at the same time, the device is readily converted for use as a deer drag. This is shown in Figure 2, and as will be noted, the loops 34, 36 are engaged about the shoulders of the wearer, while one loop 24 is engaged about the antlers of the deer. In this way, the hunter is permitted to drag the deer out of the woods, with minimum difficulty and exertion.

It will be readily apparent that the device can be folded to a compact, small size, to be easily carried in the pocket. This is shown in Figure 6, in which it is seen that the material of the flexible element can be doubled upon itself a number of times, after which one free end of the element 20 can be spirally wound about the folded portions.

Not only does the device have considerable versatility, but also, its cost is low in relation to the great strength and usefulness thereof. At the same time, the device is very light, this being of great importance, in view of the fact that the hunters must often go to relatively remote or inaccessible portions of the woods, and desire to carry the smallest amount of and the lightest possible equipment.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A deer pull and pulley comprising: pulley means including a pulley housing and a pulley member rotatable therein, a first flexible element trained about and extending in one direction from the pulley means, and having a loop at least at one end for engagement with the killed game; a sleeve disposed adjacent said housing; and a second flexible element engaged with said housing and extending in an opposite direction from the pulley means, said second flexible element being formed with a pair of side-by-side loops having inner end portions extending through said sleeve and having outer end portions adapted to be separably connected to each other for engagement about an overhead support, said last-named loops when disconnected from each other being respectively engageable about the shoulders of a hunter.

2. A deer pull and pulley comprising: pulley means including a pulley housing and a pulley member rotatable therein; a first flexible element trained about and extending in one direction from the pulley means, and having a loop at least at one end for engagement with the killed game; a sleeve disposed adjacent said housing; and a second flexible element engaged with said housing and extending in an opposite direction from the pulley means, said second flexible element being formed with a pair of side-by-side loops having inner end portions extending through said sleeve and having outer end portions adapted to be separably connected to each other for engagement about an overhead support, said last-named loops when disconnected from each other being respectively engageable about the shoulders of a hunter, said housing having an end wall and having side walls between which the end wall extends, the second element having a midlength portion extending between the side walls about said end wall.

3. A deer pull and pulley comprising: pulley means including a pulley housing and a pulley member rotatable therein; a first flexible element trained about and extending in one direction from the pulley means, and having a loop at least at one end for engagement with the killed game; a sleeve disposed adjacent said housing; and a second flexible element engaged with said housing and extending in an opposite direction from the pulley means, said second flexible element being formed with a pair of side-by-side loops having inner end portions extending through said sleeve and having outer end portions adapted to be separably connected to each other for engagement about an overhead support, said last-named loops when disconnected from each other being respectively engageable about the shoulders of a hunter; said housing having an end wall and having side walls between which the end wall extends, the second element having a midlength portion extending between the side walls about said end wall, said second flexible element including knotted ends extending between said side walls, the end wall having an opening through which the knotted ends are projected into the sleeve.

4. A deer pull and pulley comprising: a pulley housing including a pair of elongated side walls and a bight portion connected between one end of said side walls; a pulley disposed between and rotatably supported by the side walls at their other ends; a first flexible element reeved about the pulley and extending in one direction from the pulley housing, said first flexible element being adapted at its respective ends for connection to selected portions of a carcass; a second flexible element connected at both of its ends to the bight portion and trained intermediate its ends about said bight portion to define a pair of closed supporting loops each of which has opposite side portions extending from the pulley housing, both of said supporting loops being extended in side-by-side relation in the opposite direction from the pulley housing; and a retaining sleeve receiving the several side portions of the supporting loops.

5. A deer pull and pulley comprising: a pulley housing including a pair of elongated side walls and a bight portion connected between one end of said side walls and formed with an opening; a pulley disposed between and rotatably supported by the side walls at their other ends; a first flexible element reeved about the pulley and extending in one direction from the pulley housing, said first flexible element being adapted at its respective ends for connection to selected portions of a carcass; a second flexible element having both of its ends extended through said opening and enlarged to limit the second flexible element against movement in one direction through the opening, said second flexible element being trained intermediate its ends about said bight portion to define a pair of closed supporting loops each of which has opposite side portions extending from the pulley housing, both of said supporting loops being extended in side-by-side relation in the opposite direction from the pulley housing; and a retaining sleeve receiving the several side portions of the supporting loops and locatable in a position embracingly engaging said ends of the second flexible element against movement in an opposite direction through the opening of the bight portion.

6. A deer pull and pulley as in claim 5, wherein said bight portion has lips projecting in a direction away from the sleeve, one end of the sleeve being flared, the several side portions of the supporting loops diverging within the flared end of the sleeve in embracing relation to the enlarged ends of the second flexible element, said flared end of the sleeve engaging the several side portions of the supporting loops against said lips.

References Cited in the file of this patent

UNITED STATES PATENTS

| | | |
|---|---|---|
| 568,028 | Inman | Sept. 22, 1896 |
| 1,409,702 | Gill | Mar. 14, 1922 |
| 2,592,771 | Wampler | Apr. 15, 1952 |

FOREIGN PATENTS

| | | |
|---|---|---|
| 16,946 | Great Britain | 1893 |
| 338,961 | Italy | Mar. 31, 1936 |
| 655,912 | Germany | Jan. 25, 1938 |

OTHER REFERENCES

"Rigging," Department of the Army Technical Manual TM 5-725, published July 26, 1954, by the Department of the Army, Washington, D.C. (pages 102, 103 relied on).